(Model.)
J. S. TAXIS.
SPECTACLE FRAME.
No. 250,462.            Patented Dec. 6, 1881.
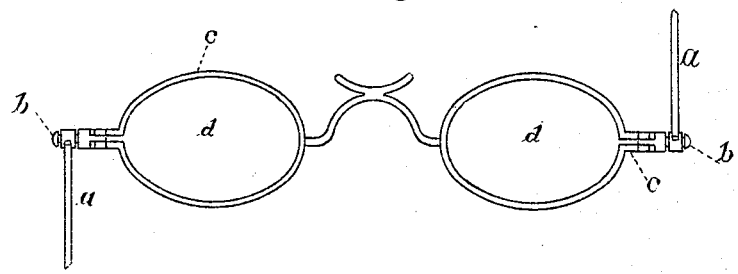
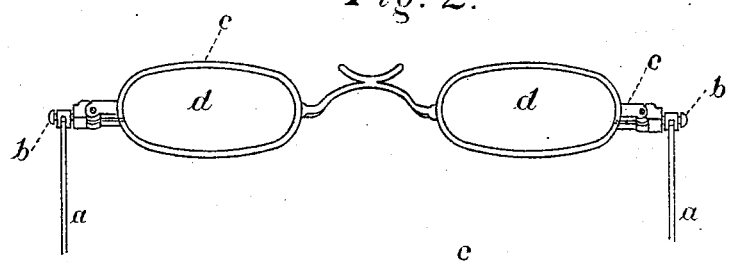
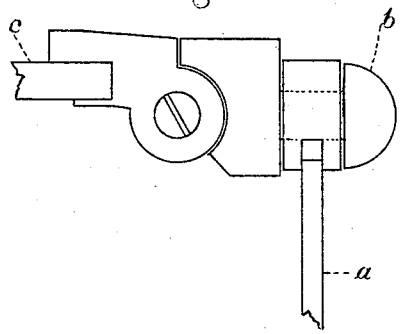
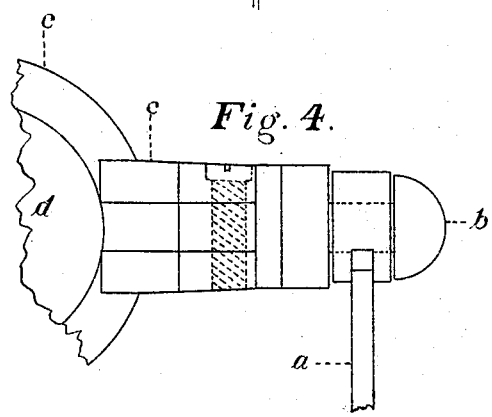
WITNESSES
INVENTOR

UNITED STATES PATENT OFFICE.

JOHN S. TAXIS, OF TRENTON, NEW JERSEY.

SPECTACLE-FRAME.

SPECIFICATION forming part of Letters Patent No. 250,462, dated December 6, 1881.

Application filed July 5, 1881. (Model.)

*To all whom it may concern:*

Be it known that I, JOHN S. TAXIS, of the city of Trenton, county of Mercer, and State of New Jersey, have invented a new and useful Improvement in Spectacles, of which the following is a description.

The invention relates to attaching the temples of spectacles to the lens-frame in such a manner that the latter may be turned edgewise to the eyes without removal from the nose, thus practically removing the glasses from the eyes and at the same time keeping the glasses where they may instantly be turned back to place—viz., to a right angle to the line of vision—thus bringing the glasses into full use.

Heretofore when the wearer wished to remove the lenses from his eyes, in order to use his eyes without the glasses before them, he has had to remove the entire spectacles from his head, or else to lift the lens-frame off the nose and place the same on his head above the forehead. Both of these methods are objectionable because inconvenient.

The object of my invention is to provide a way by which the wearer can quickly and with little trouble remove the lenses from in front of his eyes without removing the frame which contains the lenses from his nose.

The invention consists in attaching the temples to the lens-frame by the use of axes upon the ends of said lens-frame, which axes pass into and through holes in the ends of the temples, which, it will be seen, permits the lens-frame to revolve at the will of the wearer. The ordinary hinge at the end of the lens-frame is retained that the temples may close up upon the lens-frame in the usual manner when the spectacles are not in use.

By the aid of my device the wearer is enabled quickly to turn or revolve the lenses (frame and all) away from his eyes or line of vision, the lens-frame still resting upon his nose.

In the accompanying drawings, in which similar letters of reference indicate like parts, Figure 1 is a front view of the spectacles, showing the device embodying my invention. Fig. 2 is a perspective view of the same. Fig. 3 is a sectional profile view thereof; and Fig. 4 is a front sectional view of the spectacles.

$a$ is the temple of the spectacles, which has a hole through it which fits the axis $b$, upon which the entire lens-frame, with the glasses, is enabled to revolve, as is shown in Fig. 1, so that the wearer can turn the glasses away from his eyes at will by revolving the lens-frame on the axes which pass through the holes in the ends of the temples, as shown at $b$.

It will be seen that to remove the glasses or lenses from in front of the eyes it is only necessary to turn the lens-frame half-way over, which movement elevates the lenses above and out of the line of vision.

The attachment to the bridge, which appears in the drawings, is not a necessary feature, and may or may not be a part of the bridge. No claim is made for the same; its only use is to assist in keeping the lens-frame in place upon the nose when the same is inverted.

The same result sought by my invention may be attained by using a universal joint or a ball-socket.

What I claim is—

The combination, in spectacles, of the lens-frames, having extended axes, with temples having holes in which these axes are swiveled, substantially as described, and for the purpose set forth.

JOHN S. TAXIS.

Witnesses:
NELLIE E. RISDON,
CHAS. WHITEHEAD.